United States Patent [19]
Eisenbacher

[11] Patent Number: 5,975,233
[45] Date of Patent: Nov. 2, 1999

[54] HYDRAULIC SYSTEM FOR A MOTOR VEHICLE

[75] Inventor: Egon Eisenbacher, Karlstadt/Main, Germany

[73] Assignee: Mannesmann Rexroth AG, Lohr/Main, Germany

[21] Appl. No.: 08/860,848

[22] PCT Filed: Dec. 14, 1994

[86] PCT No.: PCT/EP94/04144

§ 371 Date: Jun. 6, 1997

§ 102(e) Date: Jun. 6, 1997

[87] PCT Pub. No.: WO96/18809

PCT Pub. Date: Jun. 20, 1996

[51] Int. Cl.$^6$ .................................................... F15B 11/16
[52] U.S. Cl. ........................................... 180/417; 180/141
[58] Field of Search .................................... 180/417, 141

[56] References Cited

U.S. PATENT DOCUMENTS

| | | | |
|---|---|---|---|
| 3,659,567 | 5/1972 | Murray | 123/41.12 |
| 3,664,129 | 5/1972 | Schwab | 60/53 R |
| 4,179,888 | 12/1979 | Goscenski, Jr. | 60/420 |
| 4,414,809 | 11/1983 | Burris | 60/424 |
| 4,738,330 | 4/1988 | Suzuki et al. | 180/141 |
| 5,535,845 | 7/1996 | Buschur | 180/417 |
| 5,669,461 | 9/1997 | Buschur | 180/417 |
| 5,778,693 | 7/1998 | Mientus | 62/181 |

FOREIGN PATENT DOCUMENTS

| | | |
|---|---|---|
| 0460464 | 12/1991 | European Pat. Off. . |
| 2387365 | 11/1978 | France . |
| 2850481 | 8/1979 | Germany . |
| 3628444 | 8/1987 | Germany . |

OTHER PUBLICATIONS

Patent Abstracts of Japan vol. 017 No. 324 (M–1433) Jun. 21, 1993 & JP, A,05 039054 (Toyota Motor Corp) Feb. 19, 1993.

*Primary Examiner*—Robert J. Oberleitner
*Assistant Examiner*—Dan Yeagley
*Attorney, Agent, or Firm*—Martin A. Farber

[57] ABSTRACT

A hydraulic system for a motor vehicle includes a hydraulic pump which has a hydraulic steering device including a steering motor and a steering valve which is movable from an intermediate position in opposing directions and by which hydraulic fluid lines to and from the steering motor are controlled. A ventilator motor with the bypass line are placed in series with the steering device between the latter and the hydraulic pump. The bypass valve aids the distribution of fluid flow through the ventilator motor and the bypass line for adjustment of the fluid flow in accordance with required cooling power. The bypass valve can be adjusted to allow more hydraulic fluid to flow through the bypass line during actuation of the steering valve, thereby to lower the system pressure for reduced cost and complexity of the hydraulic pump.

19 Claims, 4 Drawing Sheets

HYDRAULIC SYSTEM FOR A MOTOR VEHICLE

FIELD AND BACKGROUND OF THE INVENTION

The present invention relates to a hydraulic system for a motor vehicle.

Various concepts are known for the drive of a hydraulic fan motor and a hydraulic steering motor. One concept is based on providing two completely separate hydraulic fluid circuits for the drive of a fan and a hydraulic steering device and therefore also two pumps. The two pumps can be substantially integrated in one another, and are then referred to together as a tandem pump. Despite the extensive integration such a tandem pump is more expensive than a single hydraulic pump, such as used in motor vehicles for instance for the supplying of hydraulic fluid to only a power-assisted steering device.

In another design, known from DE-OS 28 50 481, for the driving of a hydraulic steering motor and a hydraulic fan motor only a single hydraulic pump is employed. Behind the hydraulic pump there is a priority valve which provides assurance that, up to a limit value, the entire amount of hydraulic fluid delivered by the hydraulic pump flows to the steering device. Only the excess can be fed to the fan motor. With such a design of a hydraulic system, a pump having a large piston displacement is necessary since, in addition to the quantity pumped which flows continuously to the steering device, an additional amount must be produced for the fan motor. Furthermore a priority valve is required so that a hydraulic system in accordance with DE-OS 28 50 481 is elaborate and costly.

Finally, from U.S. Pat. No. 3,664,129, a hydraulic system is known in which the fan motor is arranged in series with the steering device between the latter and a hydraulic pump. As in the case of the other embodiments sketched, the embodiment in accordance with the U.S. patent also has a bypass valve by which the division of the fluid flow through the fan motor and the bypass line circumventing the fan motor is variable as a function of the cooling power required. If the cooling power required increases, the bypass valve is adjusted in such a manner that the flow of hydraulic fluid through the bypass line is reduced. Conversely, the flow of hydraulic fluid through the bypass line increases when the cooling power required decreases. In principle, a two-position control is also possible in this connection such that the bypass line is entirely open or entirely closed. In the hydraulic system of U.S. Pat. No. 3,664,129, the hydraulic pump is to be able to cover the added pressure requirement of the hydraulic steering device and the fan motor regardless of the amount thereof, and is to be developed accordingly. Only for the limiting of parasitic power losses of the internal combustion engine which drives the hydraulic pump is it provided that, as from a given pump pressure, the pressure drop over the fan motor is reduced so that the pump pressure would only rise again when there is no longer a pressure drop over the fan motor and the fan motor is at a standstill. For the reduction of the pressure drop over the fan motor as from a given pump pressure, a pressure-limiting valve which is set to said pump pressure has its inlet connected to the outlet of the hydraulic pump, which at the same time is the inlet of the fan motor and has its outlet connected to the outlet of the fan motor.

SUMMARY OF THE INVENTION

The object of the present invention is so to develop a hydraulic system that can be manufactured at low cost.

This object is achieved for a hydraulic system in the manner that, during an actuation of the steering valve, the bypass valve can be displaced so as to increase the flow of hydraulic fluid through the bypass line. Thus, aside from the bypass valve, no further valve is necessary in order to be able to control the fan in such a manner that on the one hand the temperature of a coolant is within a given temperature range and, on the other hand, the pressure required by the steering device can be covered by the hydraulic pump without the delivery volume and pressure of the pump having to be made greater than in any event necessary for the steering device. It is sufficient to limit the maximum pressure of the system to the maximum pressure required by the steering device.

Thus, the invention can be employed to particular advantage if the hydraulic steering device is part of so-called power steering, with which a high proportion of highway vehicles is equipped today. The power required by the fan motor of such a highway vehicle is approximately equal to or less than the power required by a power-assisted steering device of the power steering, so that the steering-assistance pump of such a power steering can be used in a hydraulic system in accordance with the invention. Also, the steering assistance pump can be used as a source of hydraulic fluid for the fan motor since, even upon an activating of the hydraulic steering device by the possible backing up of the fan motor, the pressure in the system does not rise above a pressure which can be built up by the hydraulic pump.

In the intermediate position of a steering valve, the output of the fan motor is connected via the steering valve with a hydraulic fluid storage container. Therefore, there is not required an additional valve which, when the steering device is not required, connects the output of the fan motor with the hydraulic fluid storage container and, when the steering device is required, connects the output with it.

In the preferred embodiment, the bypass valve can be displaced as a function of the pressure being built up on the steering motor upon an actuation of the steering valve. In this connection it appears favorable if, upon displacement of the bypass valve during an actuation of the steering valve in addition also the presetting of the bypass valve is taken into account. Thus, it is possible, for instance, to open the bypass line wider only when the added pressure requirement of the steering device and of the fan motor reaches the maximum system pressure. Prior to this, the bypass valve can remain in its position.

The control of the bypass valve is particularly simple if it can be displaced into a given position during an actuation of the steering valve regardless of the pressure being built up on the steering motor. For this, the position of the steering valve could be detected by a sensor, for instance an electric switch. An electromagnet, by which the bypass valve can be displaced, could be activated on by a given current. The given position of the bypass valve is preferably an end position in which the cross section of the opening of the bypass line is maximum.

For the displacement of the bypass valve, however, there can also be provided two actuators, namely a first actuator by which the bypass valve is displaceable as a function of the cooling power required and a second actuator by which the bypass valve is displaceable during an actuation of the steering valve.

In principle, the bypass valve can, as shown in DE-OS 28 50 481, have three operating connections and be arranged upstream of the fan motor. One operating connection is then connected with the hydraulic pump, the second operating connection with the fan motor, and the third operating connection with the bypass line. The bypass valve is simpler and requires only precisely two operating connections if it is arranged in the bypass line. The pressure drop over the fan motor is furthermore then not increased by a pressure drop over the bypass valve.

As already mentioned, it is possible to provide a two-position control for the fan motor. There are then required for the bypass valve precisely two switch positions, the bypass line being closed in the one switch position and fully open in the other switch position. The bypass valve, however, is preferably continuously adjustable. In a first preferred embodiment it is a flow valve the cross section of opening of which is greater or less depending on the desired division of flow of hydraulic fluid. A particularly simple development consists, however, in using as bypass valve a continuously adjustable pressure-limiting valve which can be acted on in opening direction by a force derived from the pressure upstream of the fan motor, and in the closing direction by a force determined by an actuator which is dependent on the cooling power required. With such a pressure-limiting valve as bypass valve, the pressure drop over the fan motor is reduced without further measures upon the activating of the steering device and assurance is had that the steering device can be acted on by the maximum system pressure.

BRIEF DESCRIPTION OF THE DRAWINGS

With the above and other objects and advantages in view, the present invention will become more clearly understood in connection with the detailed description of preferred embodiments, when considered with the accompanying drawings of which.

DETAILED DESCRIPTION OF THE PREFERRED EMBODIMENTS

Figure 1:
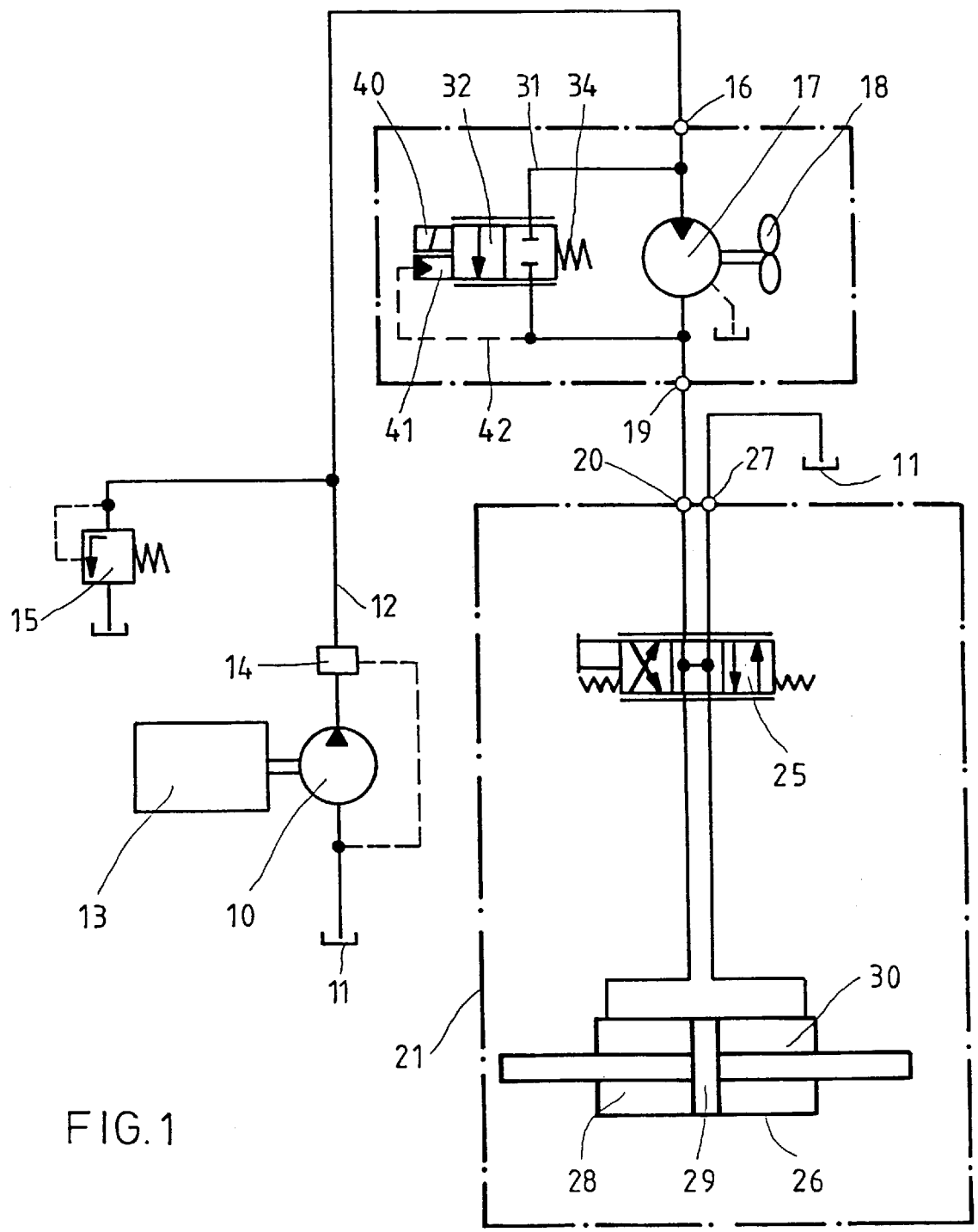
FIG. 1 shows a first embodiment in which a throttle valve which can be displaced in opening direction by two actuators is arranged in the valve line.

In the figures, 10 is a hydraulic pump which draws hydraulic fluid out of a tank 11 and delivers it into a delivery line 12. The hydraulic pump 10 is driven with different speeds of rotation by the internal combustion engine 13 of a motor vehicle. Although the hydraulic pump 10 is a fixed displacement pump, a substantially constant delivery stream flows in the delivery line 12 since the delivery line 12 contains in customary manner a fixed measuring diaphragm, not shown in detail, and a pressure control valve, also not shown in detail, which maintains the pressure drop over the measuring diaphragm constant by returning excess hydraulic fluid from the delivery side to the suction side of the pump. Measuring diaphragm and pressure-control valve can be referred to as a delivery-stream controller which is disclosed in the figures as a whole indicated with the reference numeral 14. By a pressure-limiting valve 15 which is connected to the delivery line 12 and which is ordinarily integrated in the hydraulic pump 10, the maximum system pressure is set.

The delivery line 12 leads to the inlet 16 of a hydraulic fan motor 17 by which a fan wheel 18 can be driven. The output 19 of the fan motor 17 is connected with the pressure connection 20 of the hydraulic power-steering device 21.

The hydraulic power-steering device 21 comprises a power-assisted steering valve 25 and a power-assisted steering motor in the form a synchronous cylinder 26. The power-assisted steering valve has four operating connections, one of which is connected to the pressure input 20 of the power-assisted steering device, a second to a tank connection 27 of the power-assisted steering device 21 and above it with the tank 11, a third to the annular chamber 28 on the one side of the piston 29, and the fourth to the annular chamber 30 on the other side of the piston 29 of the synchronous cylinder 26. In the spring-centered intermediate position of the power-assisted steering valve 25, all four connections of the power-assisted steering valve are connected with each other.

By the turning of the steering wheel of a motor vehicle, the power-assisted steering valve 25 can be brought from its intermediate position into a first or second lateral operating position depending on the direction of turning. In the one operating position, the annular chamber 28 of the synchronous cylinder 26 is connected with the pressure connection 20, and the annular chamber 30 of the synchronous cylinder 26 is connected with the tank connection 27 of the auxiliary power-assisted steering device 21. Upon a deflection of the power-assisted steering valve 25 into the other operating position, the connections are reversed.

The hydraulic pump 10, including the delivery stream controller 14 and the pressure-limiting valve 15 as well as the steering device 21 are all ordinary parts which are already installed today in large number in motor vehicles.

Figure 2:
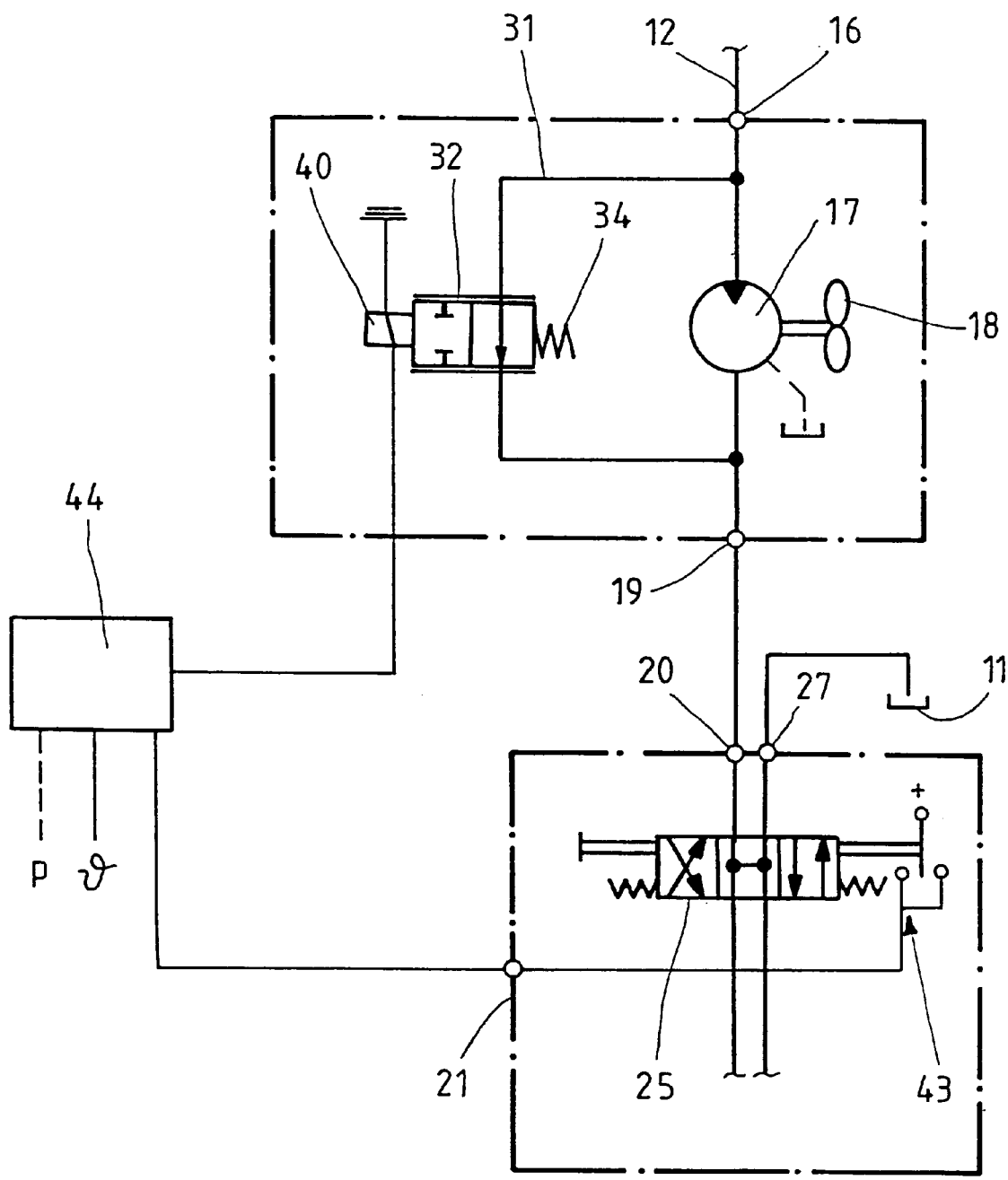
FIG. 2 shows a second embodiment in which a throttle valve in the bypass line of the fan motor can be moved in closing direction only by an electromagnet.
Figure 3:
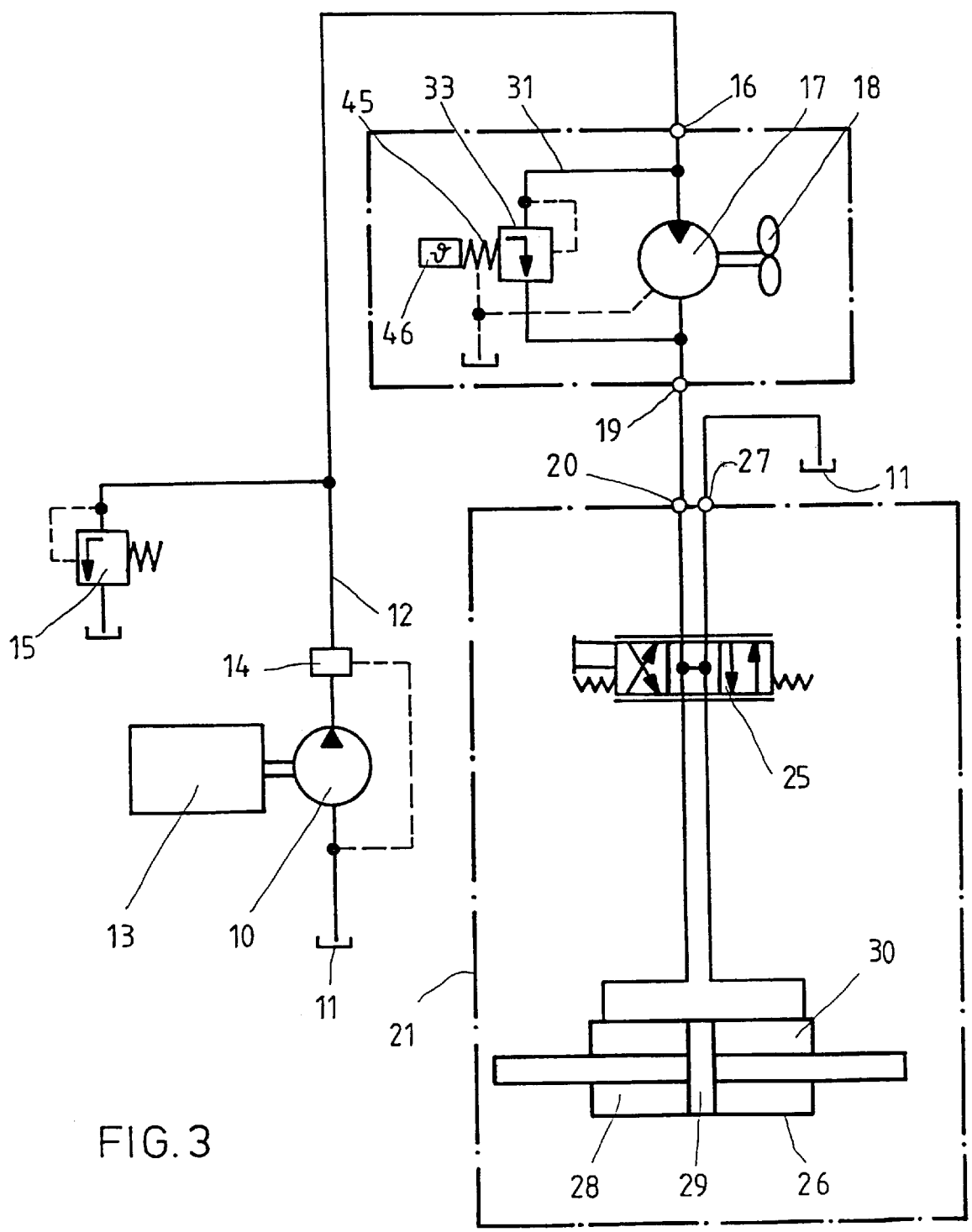
FIG. 3 is a third embodiment which has, in the bypass line of the fan motor, a pressure-limiting valve which is acted on in closing direction by a compression spring the initial tension of which can be varied by an element of expandable material.
Figure 4:
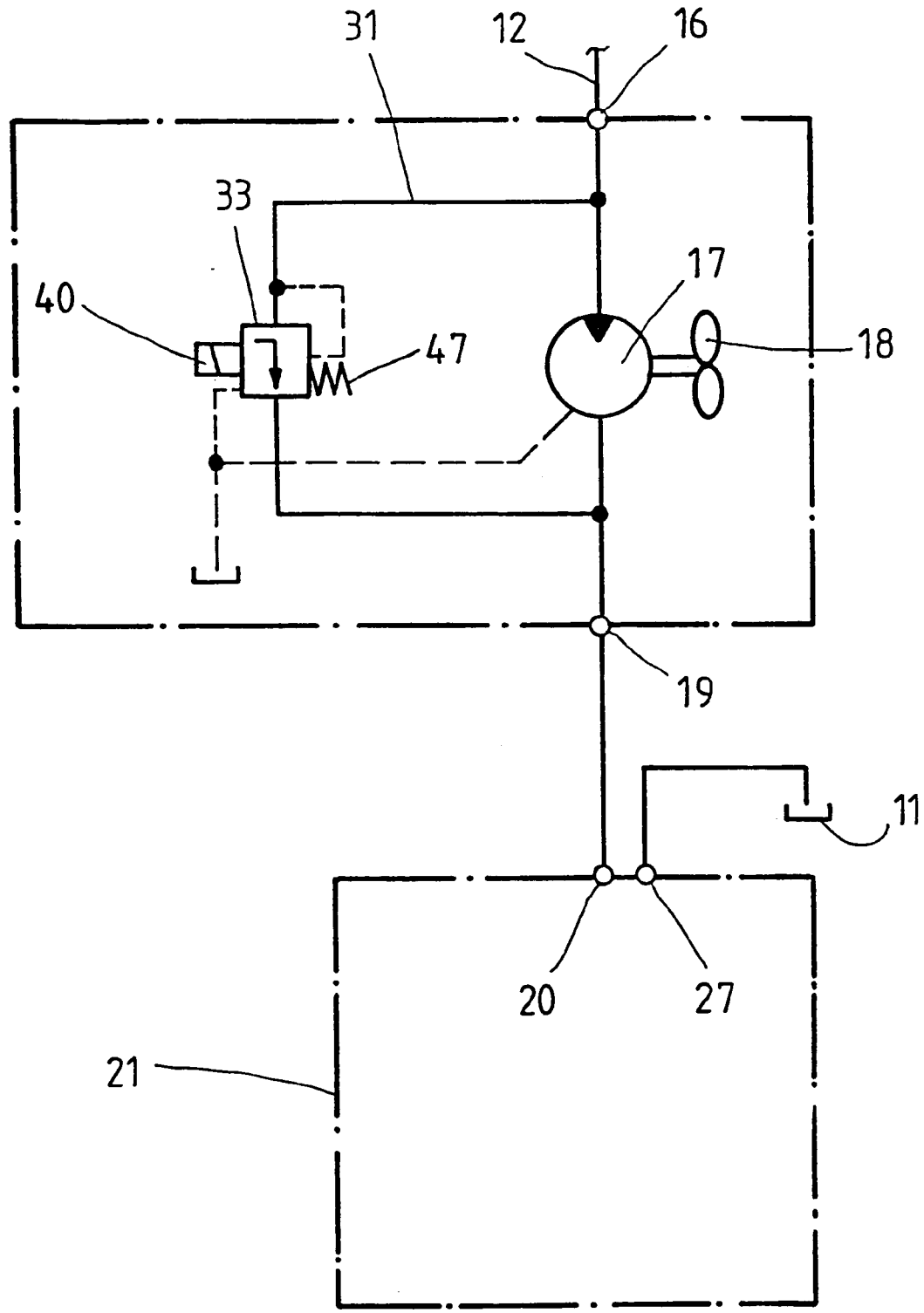
FIG. 4 shows an embodiment similar to FIG. 3 in which, however, the force in closing direction is variable by an electromagnet.

The fan motor 17 is circumvented in all four embodiments by a bypass line 31 in which a continuously displaceable throttle valve 32 is present in the embodiments of FIGS. 1 and 2 and a pressure-limiting valve 33 in the embodiments according to FIGS. 3 and 4.

In the embodiment according to FIG. 1, the throttle valve 32 is acted on in closing direction by a compression spring 34. In the opening direction, two actuators 40 and 41 can act on the throttle valve 32. The first actuator 40 is a proportional electromagnet which is controlled by a control electronics, not shown in detail in FIG. 1. The second actuator 41 is a hydraulic actuator which, via a line 42 connected with the output 19 of the fan motor 17, is acted on by the pressure present at the input 20 of the power-assisted steering device 21.

In the operation of a motor vehicle, the temperature of the coolant of the internal combustion engine is reported to the control electronics which controls the electromagnet in such a manner that, depending on the cooling power required, the cross section of opening of the throttle valve 32 and thus of the bypass line 31 is greater or less. The smaller the opening cross section, the greater the amount of hydraulic fluid which flows through the fan motor 17 and the greater the pressure at the input 16 of the fan motor, since the torque to be applied increases with the speed of rotation of the fan wheel 18.

The hydraulic actuator 41 is so designed that it can completely open the throttle valve 32 with a pressure of for instance 10 bar at the input 20 of the power-assisted steering device 21. As soon as the load pressure in the cylinder 26 reaches the threshold value of 10 bar, the throttle valve 32 is in any event completely open. The fan motor 17 therefore stops. Since the force exerted by the actuator 41 on the throttle valve 32 adds on to that of the electromagnet 40, the throttle valve 32 can also be entirely open even with a steering pressure which is less than 10 bar. In any event, however, even with a steering pressure which is less than 10 bar, the speed of rotation of the fan motor 17 is reduced. Since the steering of a motor vehicle, and, in particular, power-assisted steering is in each case activated only for a short time, the temperature of the coolant cannot reach an impermissibly high value within this time. A slight increase in the temperature can be compensated for by increased cooling after the steering process.

The embodiment of FIG. 2 differs in three respects from the embodiment of FIG. 1. On the one hand, in addition to the compression spring, there is present for the throttle valve 32 only a single actuator in the form of the electromagnet 40. Secondly, the compression spring 34 does not act in the closing direction but in the opening direction, and the electromagnet 40 does not act in the opening direction of the throttle valve 32 but in its closing direction. In this way, a so-called fail-safe function of the throttle valve 32 is obtained for the steering device 21. Upon the dropping-out of the electromagnet 40, the throttle valve 32 is entirely open, so that the amount of hydraulic fluid conveyed by the hydraulic pump 10 can flow unimpeded to the steering device and the latter responds rapidly upon actuation. The fan motor 17 in this case stops or turns with a minimum speed of rotation. Thirdly, there is associated with the power-assisted steering valve 25 an electric switch 43 which gives off a signal to the control electronics 44 whenever the power-assisted steering valve 25 is moved out of its intermediate position.

The control electronics 44 is furthermore fed a signal which is a measure of the temperature of the coolant. As a function of this signal and of the position of the electric switch 43, the control electronics 44 controls the electromagnet 40. If the switch 43 is open and the steering device 21 therefore not activated, then the current flowing through the electromagnet 40 is higher the higher the temperature of the coolant is. With the switch 43 closed and therefore with the steering device 21 activated, various manners of control are possible. A first possibility is that the control electronics 44 turns the electromagnet 40 off whenever the electric switch 43 is closed. In other words, upon an activating of the steering device 21, the throttle valve 32 opens completely so that the fan motor remains stationary or turns with minimum speed of rotation.

Another possibility is so to control the electromagnet 40 that the maximum system pressure is established upstream of the fan motor 17. In this case it would be necessary to detect the pressure upstream of the fan motor 17 by a pressure sensor which provides the control electronics 44 with a signal corresponding to the pressure, as is indicated by a dash line leading to the control electronics 44. Finally, it is also conceivable, with the switch 43 closed, to control the electromagnet 40 as a function of the pressure at the inlet 20 of the steering device 21. In such case, this pressure would have to be detected with a pressure sensor.

The pressure-limiting valve 33 present in the bypass line 31 in the embodiment of FIG. 3 is acted on in opening direction by the pressure upstream of the fan motor and in the closing direction by a compression spring the initial tension of which depends on an expansion of an expansion element 46 exposed to the coolant temperature and which is contained in a spring chamber which is relieved by a leakage-oil line to the tank 11 so that the pressure downstream of the fan motor 17 cannot affect the valve 33.

Depending on the expansion of the expansion element 46 and the force exerted by the compression spring 45 as a function thereof, a different pressure is established at the inlet 16 of the fan motor 17, so that the fan motor 17 turns with different speeds of rotation depending on the expansion of the expansion element 46. The higher the temperature of the coolant, the larger the expansion element 46 is, the stronger the spring 45 is pretensioned, the greater the pressure at the inlet of the fan motor 17 and the higher the speed of rotation of the fan motor. Pretensioning of the compression spring 45 is possible up to a given value, which thus determines the maximum pressure drop over the fan motor 17.

Let us now assume a given temperature of the coolant and thus a given size of the expansion element 46. The hydraulic pump 10 conveys hydraulic fluid into the delivery line 12 which fluid discharges over the fan motor 17 and the bypass line 31 and over the power-assisted steering valve 25 present in intermediate position to the tank 11. Let us say that the pressure drop over the fan motor 17 is, for instance, 40 bar and the maximum system pressure is 60 bar. The steering device 21 is now actuated and it requires a pressure of, for instance, 10 bar. An increase in pressure resulting therefrom at the inlet 16 of the fan motor 17 causes the pressure-limiting valve 33 to open further and, as a result, the pressure at the inlet 16 of the fan motor 17 remains at first limited to 40 bar. The pressure drop over the fan motor 17 has therefore decreased to 30 bar and the present cooling power is less than the cooling power required. If the steering device 21 is actuated for only a short time, this has no substantial effect on the temperature of the coolant or on the size of the expansion element 46. Upon a lengthier activation of the steering device 21, the temperature of the coolant increases however, and the expansion element 46 becomes larger. Finally, a pressure of 40 bar plus 10 bar, i.e. a pressure of 50 bar, is established at the inlet of the fan motor 17.

Let us now assume that the steering device 21 requires a pressure of 30 bar. In this case also, the pressure at the inlet 16 of the fan motor 17 remains initially at 40 bar. The pressure drop over the fan motor 17 is now still only 10 bar. Upon a lengthier actuation of the steering device 21, the temperature of the coolant increase. The expansion element 46 becomes larger and tensions the spring 45 more strongly. Finally, the maximum system pressure of 60 bar is established at the inlet 16 of the fan motor 17 so that the drop in pressure over the fan motor 17 is 30 bar and the cooling power is too little to maintain the temperature of the coolant at the previous value within the permitted temperature range. This is again compensated for by increased cooling after a deactivating of the steering device 21.

If the pressure requirement of the steering device is 60 bar, then the pressure-limiting valve 33 is completely open. The fan motor 17 turns with minimum speed of rotation or stops. Even if the temperature of the coolant rises and the expansion element 46 becomes larger, this does not make any change in the condition of the pressure-limiting valve 33, since the valve, for instance by a stop for the expansion element 46, is designed for a maximum pressure of 60 bar at the inlet 16 of the fan motor 17.

One variation of the embodiment according to FIG. 3 consists therein that the valve 33 is acted on in opening direction not only by the pressure upstream of the fan motor 17 but also by another actuator, for instance an electromagnet. In such case, upon activation of the steering device, the valve 33 can, for instance, be opened entirely.

The embodiment according to FIG. 4 differs from the embodiment of FIG. 3, on the one hand, in the manner that the pressure-limiting valve 33 can be acted upon in closing direction directly by a force-controlled proportional electromagnet 40. Depending on the temperature of the coolant, the electromagnet is acted on by a different current and exerts a different, large force on a valve body of the valve 33. The manner of operation of the system in accordance with FIG. 4 can be exactly the same as that of the system in accordance with FIG. 3.

The use of an electromagnet, however, also affords the possibility of entirely disconnecting the electromagnet 40 upon an activation of the steering device 21 and of thus reducing the pressure drop over the fan motor 17, upon each activation of the steering device 21, to a minimum value regardless of its pressure requirement. The period of time during which the steering device 21 is activated is generally so short and the total duration of the activation, expressed as a percentage of the total operating time of the motor vehicle, is generally so small that the temperature of the coolant does not exceed the permissible range during the steering and can be reduced further during the time in which the steering device 21 is not activated. On the other hand, the valve body of the pressure-limiting valve 33 of the system in accordance with FIG. 4 is acted on in opening direction not only by the pressure upstream of the fan motor 17 but also by a weak compression spring 47 which, when the electromagnet 40 is disconnected or has dropped out, assures a specific position of rest of the pressure-limiting valve 33. The valve 33 is open in this position. Also in the embodiment of FIG. 4, the one side of the pressure-limiting valve 33 is connected to the tank 11 by a leakage-oil line.

It can be seen that by the invention there has been created a hydraulic system for a motor vehicle which is inexpensive and in which a hydraulic steering device and a hydraulic motor for the driving of a fan wheel are so combined with each other that the steering part performs its function in customary manner and the cooling power also satisfies the existing requirements.

I claim:

1. A hydraulic system for a motor vehicle comprising:
    a hydraulic pump, a hydraulic steering device which comprises a steering motor and a steering valve having an intermediate position, the steering valve being displaceable in opposite directions from the intermediate position by which pressure-fluid paths to and from the steering motor can be controlled
    a fan motor which is circumvented by a bypass line and is arranged in series with the steering device between the latter and the hydraulic pump; and
    a temperature responsive actuator, and a bypass valve located in the bypass line and serving for dividing the fluid flow through the fan motor and through the bypass line, the bypass valve being adjustable by the actuator in dependency on the temperature of a cooling medium; wherein
    the bypass valve is a continuously adjustable pressure-limiting valve which can be acted on in opening direction by a force derived from pressure upstream of the fan motor and in closing direction by a force dependent from an actuation of the steering device and determined by the actuator.

2. A hydraulic system according to claim 1, wherein the hydraulic steering device is a power-assisted steering device.

3. A hydraulic system according to claim 2, wherein the hydraulic pump is a power-assisted steering pump which is adapted to the pressure and feed requirements of the power-assisted steering device.

4. A hydraulic system according to claim 1, wherein the hydraulic steering device is a power-assisted steering device, wherein the hydraulic pump is a power-assisted steering pump which is adapted to the pressure and feed requirements of the power-assisted steering device, and wherein in the intermediate position of the steering valve, an output of the fan motor is connected via the steering valve to a hydraulic-fluid storage container.

5. A hydraulic system according to claim 4, wherein the bypass valve is displaceable as a function of pressure building up on the steering motor during an actuation of the steering valve.

6. A hydraulic system according to claim 5, wherein during an actuation of the steering valve, the bypass valve is displaceable as a function of its prior setting and as a function of the pressure building up on the steering motor.

7. A hydraulic system according to claim 1, wherein the bypass valve is displaceable into a given position during an actuation of the steering valve, independently of pressure building up on the steering motor.

8. A hydraulic system according to claim 5, wherein during an actuation of the steering valve, the bypass valve is displaceable into an end position in which the cross section of opening of the bypass line is maximum.

9. A hydraulic system according to claim 1, wherein the bypass valve is displaceable by the actuator as a function of cooling power required, and said actuator is controllable also during an actuation of the steering valve.

10. A hydraulic system according to claim 9, wherein the actuator is an electromagnet.

11. A hydraulic system according to claim 1, wherein the actuator is a first actuator, and the bypass valve is displaceable by the first actuator as a function of the cooling power required and by a second actuator during an actuation of the steering valve.

12. A hydraulic system according to claim 11, wherein the second actuator is a hydraulic actuator which is acted on by pressure at the output of the fan motor.

13. A hydraulic system according to claim 1, wherein the bypass valve has two operating connections.

14. A hydraulic system according to claim 13, wherein the bypass valve is a continuously adjustable flow valve.

15. A hydraulic system according to claim 1, wherein said actuator is an expansion element.

16. A hydraulic system according to claim 7, wherein during an actuation of the steering valve, the bypass valve is displaceable into an end position in which the cross section of opening of the bypass is maximum.

17. The hydraulic system according to claim 1, wherein the bypass valve is a pressure limiting valve, and connects to an outlet of the fan motor, wherein the outlet side of the fan motor and a control side of the pressure limiting valve are pressure-isolated from one another, and wherein the control side is connected to a pressure-medium storage container via a leak-oil line.

18. The hydraulic system according to claim 1, wherein the bypass valve is a pressure limiting valve, and the pressure limiting valve can be set only at a maximum pressure value which is equal to, or smaller than, a maximum loading pressure of the steering system.

19. A hydraulic system according to claim 1, wherein the actuator is an electromagnet.

* * * * *